United States Patent [19]
McCarthy

[11] 4,416,575
[45] Nov. 22, 1983

[54] UNION NUT

[75] Inventor: Barry McCarthy, London, England

[73] Assignee: Quinn Engineers Ltd., London, England

[21] Appl. No.: 302,985

[22] Filed: Sep. 17, 1981

[30] Foreign Application Priority Data

Mar. 18, 1981 [GB] United Kingdom ............... 8108419

[51] Int. Cl.³ .............................................. F16B 37/00
[52] U.S. Cl. .................................. 411/432; 285/414; 403/336
[58] Field of Search ............... 411/432; 403/336, 337, 403/299, 344; 285/336, 354, 387, 388

[56] References Cited

U.S. PATENT DOCUMENTS

| | | | |
|---|---|---|---|
| 401,996 | 4/1889 | Brogden | 403/336 X |
| 2,412,487 | 12/1946 | Amley et al. | 403/336 X |
| 3,296,828 | 1/1967 | Stübner et al. | 403/337 X |
| 4,202,568 | 5/1980 | Ström | 285/336 |
| 4,313,628 | 2/1982 | Duenke | 285/387 |
| 4,357,913 | 11/1982 | Hori et al. | 123/41.49 |

FOREIGN PATENT DOCUMENTS 205800 2/1957 Australia ..................... 285/137 R Primary Examiner—Wayne L. Shedd
Attorney, Agent, or Firm—Oblon, Fisher, Spivak, McClelland & Maier

[57] ABSTRACT

A union nut, for cooperation with a first tube having an external thread and a second tube having a radially outwardly projecting flange, has an annular body with an internal thread to engage with the external thread of the first tube, the body being made of a synthetic resinous plastics materials of adequate strength to resist forces exerted by tightening of the nut, and a tool-engaging abutment element secured releasably on the body and at least partially projecting radially inwardly beyond the internal thread of the body so as to be able to abut axially against a flange on the other tube. Tightening of the nut onto the threaded tube draws the two tubes axially together. The abutment element is made of a material, e.g. stainless steel, selected to have adequate strength to resist bending or fracture under the axial forces applied, and to resist damage by the application of a tool to the nut.

14 Claims, 2 Drawing Figures

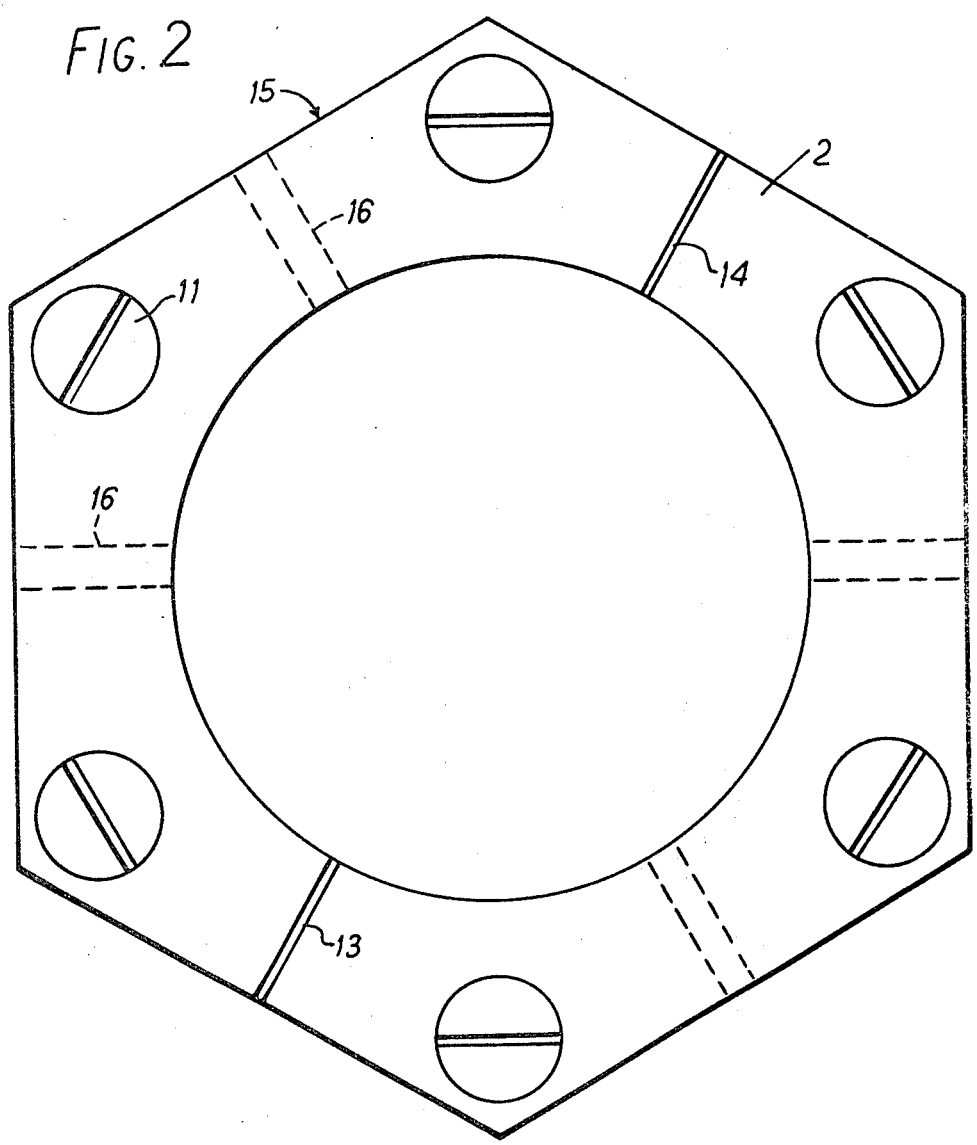

UNION NUT

BACKGROUND OF THE INVENTION

1. Field of the Invention

This invention relates to a union nut suitable for drawing together and compressing axially two items to be joined together and, although it is not restricted to that field, the nut of the invention is particularly applicable to the art of coupling together portions of tubing, and for ease of illustration of the nature and advantages of the invention a preferred embodiment will be described later herein by way of non-limiting example.

2. Description of the Prior Art

In the connection of portions of tubing placed end to end, it is conventional to place a resiliently compressible seal element between axially-facing and faces of the respective portions, and to exert exial pressure on the two portions to compress the seal of good fluid-tight engagement. In the commercial use for such joints, and especially for example in the brewing and chemical industries, the joint may be subjected to quite high changes and temperature, and this has been known to cause jamming of a threaded portion of a union nut on a threaded end portion of one of the tubes, due especially to differences in the coefficient of expansion of the nut material relative to the tube material, and to the possibility of corrosion occurring between the threading of the nut and the threading of the tube. Such jamming may be avoided or at least reduced by making the nut of a material having a similar or equal coefficient of expansion as the tube part, and/or making the nut of a material having very low surface-to-surface friction and less liability to corrode, e.g. of plastics material. However, the nut must also be subjected to high forces for tightening and loosening of the joint, e.g. by the application of a tool such as a spanner, and it is found that plastics materials used in commercially-practicable thicknesses do not stand up to the manipulation required.

In a conventional type of end-to-end joint for two portions of tube, the end of one tube is provided with an external threading, and the end of the other tube portion is provided with a lip or flange which can be abutted by a flange of the union nut so that axial drawing-together of the two tube portions may be obtained by tightening the nut onto the threaded tube portion. Such tube portions may form part of a fixed installation in which it is undesirable to have to release or to cut the tube portions, but nevertheless the joint may need releasing and tightening from time to time, e.g. for cleaning and/or seal replacement. As the union nut must include a flange capable of abutting against the flange of the respective tube portion, the nut can only be engaged onto the tube portion by bringing it up to the tube flange from a remote position, i.e. the tube must be wholly released, or cut, to permit the nut to be placed about it. This is a considerable disadvantage in the use of such unions, and it is accordingly a second object of the invention to provide an improved union nut of which part can be engaged onto the flanged tube portion from the direction of the seal element and, after proper assembly, the nut can then be used in the usual way by abutting against the tube flange, thereby obviating the cutting or removal of that tube portion at each time of making up or releasing the joint. It is accordingly a first object of the invention to provide an improved union nut in which a portion which provides the threading action is made of a material which is inherent less likely to bind onto a threaded tube, and which nevertheless can stand up to the heavy forces required during tightening and loosening.

SUMMARY OF THE INVENTION

According to the present invention a union nut, for drawing axially together a first tube portion having an external thread and a second tube portion having a radially outwardly projecting flange, comprises an annular body having at least part thereof made of a synthetic resinous plastics material and provided with an internal thread to engage with the external thread of the first tube portion, said synthetic resinous plastics material being of a strength suitable to enable it to resist the forces exerted by adequate tightening of the nut, and tool-engaging abutment means secured releasably on the annular body and projecting radially inwardly beyond said internal thread for abutment axially against said flange on said second tube portion, such that tightening of the nut onto the threaded tube portion draws the two tube portions axially together, the abutment element being made of a material selected to have sufficient strength to resist bending or fracture under the axial forces applied and to resist damage by the application of a tool to the nut, e.g. a suitable steel such as stainless steel.

Preferably the synthetic resinous plastics material is selected to provide relatively very low surface-to-surface friction, e.g. Nylon 66.

The abutment element is preferably metal, e.g. stainless steel, and may also be annular, and its portion extending radially inwards is preferably about the entire inner periphery thereof. The tool engagement feature may be external faceting, e.g. the provision of a hexagon face, for engagement by a spanner.

With such a construction, the entire nut is subjected to any temperature changes which may affect the tube portions but the only part of the nut in diametral engagement with the tube portions is made of the plastics material which is less liable to bind, both for mechanical reasons and for reasons due to the nature of its surface friction. Again, that portion of the nut which is subjected to high stresses, e.g. exial tightening and tool engagement, is not included in any diametral engagement so that its relative coefficient of expansion is immaterial, whereas it is inherently adapted to stand up to the axial abutment forces and the application of the tool.

The annular body of plastics may advantageously be in the form of a simple annulus having an internal thread along at least a major part of its axial length, the abutment means being secured to an axial end face of the annular body. In a preferred form, the abutment means is a plate having an aperture which is of such diameter as to be a clearance fit about said second tube portion but such that the part of the plate bounding the aperture is positioned to abut the flange of the tube portion. The outer periphery may be a hexagon or other geometrical shape suitable to engage a spanner.

In a simple arrangement, the abutment means is secured to the annular body by a plurality of screws engaged through the abutment and threaded into the annular body, such screws preferably being countersunk in the abutment plate.

In accordance with a further feature of the invention, the abutment means are in at least two discrete parts each of which does not embrace the second tube portion by more than about half of the periphery of the tube portion. Such a construction permits the abutment means to be positioned beyond the tube flange, prior to securing to the annular body, and thereafter secured in position and then the whole nut tightened. With such an arrangement, the union between the two tube portions can be made and undone as many times as required, without the necessity of cutting or removing the tube portion having the flange. In a preferred arrangement, the abutment means is in the form of a plate which is divided diametrically, and advantageously with an equal number of securing means fastening each part of the plate to the annular body.

Instead of securing the abutment means to the annular body by threading of screws or the like into the annular body, means for securing the abutment means on the annular body may comprise a supporting member, preferably of the high stress material, positioned at an axial end face of the annular body remote from the second tube portion, and fastening means extending from the supporting member to the abutment means, and for example, through the annular body.

The annular body and the abutment means may advantageously be provided with respective tenon and recess formations to ensure rotational keying between them.

In order that the nature of the invention may be readily ascertained, an embodiment of union nut particularly adapted to use on pipelines in the brewing industry is hereinafter particularly described by way of non-limiting example with reference to the figures of the accompanying drawings.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several view and wherein:

FIG. 2 is an axial elevation viewed from the abutment element side of the nut.

DETAILED DESCRIPTION OF THE PREFERRED EMBODIMENT

Figure 1:
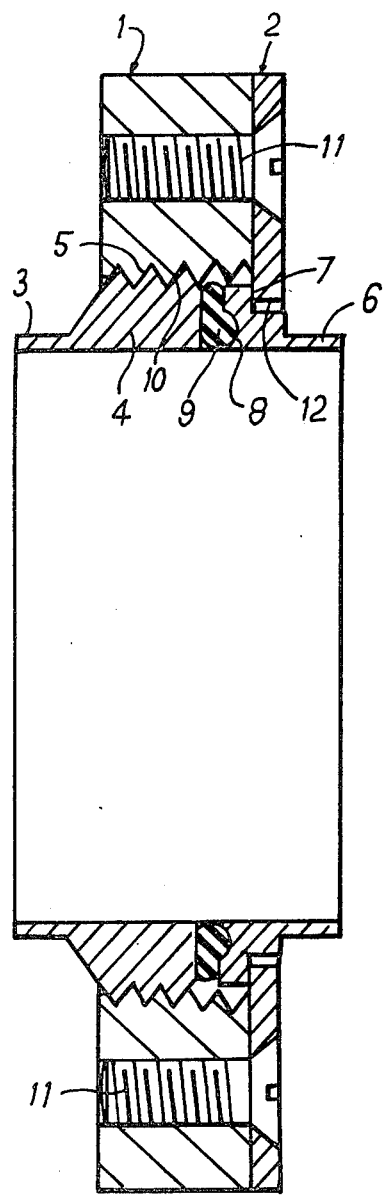
FIG. 1 is an axial section of the union nut engaged on two portions of tubing to provide a tightenable sealing action.

Referring to the drawings, the union nut comprises an annular body designated generally by reference numeral 1, and an abutment element designated generally by reference numeral 2.

A first tube portion 3 of a pipeline is provided at its end with enlargement 4 having an external thread 5. Another tube portion 6, aligned with the first tube portion, has at its end a flange 7 which projects radially outwardly, and which is recessed at 8 to receive part of a sealing O-ring 9 which can become compressed and deformed between the axially-opposing end faces of the enlargement 4 and the flange 7, when the two tube ends are axially tightened.

The annular body 1, made for example of the commercial material known as "Nylon 66", has an internal thread 10 which meshes with the external thread of the tube portion 3.

The abutment element 2 is in the form of a plate made, for example, of stainless steel of suitable grade and thickness, and is secured to one axial end face of the annular body 1 by means of six metal countersunk screws 11 placed at symmetrical positions about the axis of the nut, see FIG. 2. The plate has its internal periphery 12 of less diameter than the external periphery of the flange 7, so that the plate can abut axially on the flange to draw the tube portions together and compress the O-ring. Referring to FIG. 2, it is seen that the plate is made in two parts separated by diametrically opposed splits 13 and 14. This formation permits each part of the (un-assembled) plate to be brought into position about the tube portion 6 without necessitating any cutting or dismounting of the tube portion 6.

The annular body 1 and the element 2 each have respective radial recesses or tenons, as at 16, to engage one within the other and provide rotational keying between the two.

With the nut in fully assembled condition as shown in the drawings, the axial forces are exerted by the threading of the annular body, and by the inner peripheral portion of the plate, and both of these can readily be constructed of suitable strength to stand up to any degree of tightening called for. The plate itself has a hexagon outer periphery 15 for the application of a tool. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A union nut, for drawing axially together a first tube portion having an external thread and a second tube portion having a radially outwardly projecting flange, comprising an annular body having at least part thereof made of a synthetic resinous plastics material and provided with an internal thread to engage with the external thread of said first tube portion, and tool-engaging abutment means secured releasably on the annular body and projecting radially inwardly beyond said internal thread for abutment axially against said flange of said second tube portion.

2. A union nut, as claimed in claim 1, wherein said synthetic resinous plastics material is selected to provide relatively very low surface-to-surface friction.

3. A union nut, as claimed in claim 1, wherein said synthetic resinous plastics material is Nylon 66.

4. A union nut, as claimed in claim 1, wherein the abutment means are made of metal.

5. A union nut, as claimed in claim 1, wherein the abutment means are made of stainless steel.

6. A union nut, as claimed in claim 1, wherein said abutment means are annular and the radially inwards extending portion is disposed about the entire inner periphery thereof.

7. A union nut, as claimed in claim 6, wherein the annular abutment means is externally faceted for engagement by a spanner.

8. A union nut, as claimed in claim 1, wherein said annular body has said internal thread along at least a major part of its axial length.

9. A union nut, as claimed in claim 1, wherein said abutment means are secured to an axial end face of said annular body.

10. A union nut, as claimed in claim 1, wherein said abutment means is a plate having an aperture which is of such diameter as to be a clearance fit about said second tube portion but such that the part of the plate bounding said aperture is positioned to abut the flange of the tube portion.

11. A union nut, as claimed in claim 1, wherein the abutment means is secured to the annular body by a plurality of screws engaged through the abutment means and threaded into the annular body.

12. A union nut, as claimed in claim 1, wherein said abutment means are in at least two discrete parts each of which does not embrace the second tube portion by more than about half of the periphery of the tube portion.

13. A union nut, as claimed in claim 12, wherein the abutment means is a plate which is divided diametrically.

14. A union nut, as claimed in claim 1, wherein said annular body and said abutment means comprise respective tenon and recess formations to ensure rotational keying between them.

* * * * *